3,553,228
3-SUBSTITUTED-4H[1]BENZOPYRANO[3,4-d]
ISOXAZOLES
Jules Freedman, Milwaukee, Wis., assignor to Colgate-Palmolive Company, New York, N.Y., a corporation of Delaware
No Drawing. Filed Sept. 26, 1967, Ser. No. 670,772
Int. Cl. C07d 85/22
U.S. Cl. 260—307                                5 Claims

ABSTRACT OF THE DISCLOSURE

The compounds are 4H[1]benzopyrano[3,4-d]isoxazoles substituted in the 3 position which are useful in the preparation of wood preservatives, moth proofing agents, pickling inhibitors and skeletal muscle relaxants. Two species disclosed are 4H[1]benzopyrano[3,4-d]isoxazole-3-carboxylic acid and 4H[1]benzopyrano[3,4-d]isoxazole-3-carboxamide.

SUMMARY OF INVENTION

The present invention relates to novel 3-substituted-4H[1]benopyrano[3,4-d]isoxazoles, methods of preparing such compounds and compositions containing them.

DETAILED DESCRIPTION

The novel compounds of the present invention have the following formula

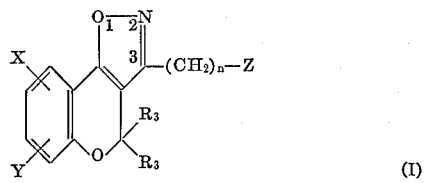

(I)

in which X and Y are the same or different members selected from hydrogen, halo such as chloro, bromo or fluoro, hydroxy, lower alkyl of 1 to 4 carbon atoms such as methyl or propyl, nitro, methylenedioxy, lower alkoxy such as methoxy, ethoxy or propoxy and trifluoromethyl, $n$ is 0 to 3, Z is selected from —CN and

in which A is O, $NR_1$ or $NOR_1$, and B is $OR_1$,

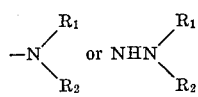

and $R_1$ and $R_2$ are hydrogen, a lower alkyl of 1 to 4 carbon atoms, an alkenyl of 3 to 6 carbon atoms such as allyl and hexenyl, phenyl, including a nuclear substituted phenyl such as o-methoxyphenyl or p-chlorophenyl, an aralkyl of 7 to 11 carbon atoms, particularly a phenyl-lower alkyl such as benzyl, phenethyl, phenyl-isopropyl and including a nuclear substituted phenyl-lower alkyl such as p-chlorobenzyl or p-methoxybenzyl, an aminoalkyl such as aminoethyl, aminopropyl and the like, a cycloalkyl of 3 to 7 carbon atoms such as cyclopropyl and cyclohexyl, a cycloalkyl-lower alkyl in which the cycloalkyl contains 3 to 7 carbon atoms such as cyclopentyl-ethyl, and groups in which $R_1$ and $R_2$ are joined together to form amino groups in which the nitrogen is part of a cyclic group such as morpholino, pyrrolidino, piperidino, a 4-lower alkyl-1-piperazino such as 4-methyl-1-piperazino, N-phenyl-lower alkyl piperazino, and N-hydroxy-lower alkyl piperazino or

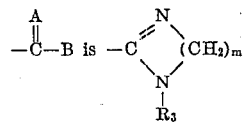

in which $m$ is 2 to 4 carbon atoms such as imidazolino, and $R_3$ is selected from hydrogen, lower alkyl of 1 to 4 carbon atoms and phenyl including a nuclear substituted phenyl such as p-chlorophenyl and p-methoxyphenyl.

The compounds of the present invention may be conveniently prepared employing as the basic starting material a 4-chromanone of the formula

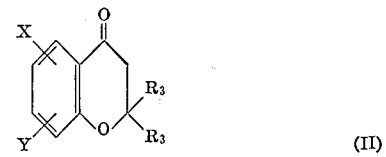

(II)

in which $R_3$, X and Y are as previously defined.

The unsubstituted 4-chromanone is a known compound and the substituted compounds may be prepared as described in the literature [C. D. Hurd, et al., J. Am. Chem. Soc., 76, 5065 (1954) and S. Wawzonek, et al., J. Am. Chem. Soc., 76, 1080 (1954)].

Representative of the 4-chromanones which may be employed as starting materials are:

4-chromanone,
6-methoxy-4-chromanone,
6-bromo-4-chromanone,
8-methyl-4-chromanone,
6-trifluoromethyl-4-chromanone,
2,2-dimethyl-4-chromanone,
6-chloro-4-chromanone,
2-phenyl-4-chromanone,
6-methyl-4-chromanone,
6,7-methylenedioxy-4-chromanone, and
6-chloro-2-phenyl-4-chromanone.

In the preferred method of preparation of the novel compounds, a 4-chromanone is treated with a lower alkyl oxalate such as ethyl oxalate, in the presence of a suitable base such as sodium amide, sodium methoxylate or sodium hydride, in an anhydrous reaction medium such as toluene or benzene, to form a lower alkyl 4-oxochroman-3-glyoxylate. The ring closure is then effected by treating the glyoxylate with hydroxylaminehydrochloride in ethanol under reflux conditions to form the lower alkyl 4H[1]benzopyrano[3,4-d]isoxazole-3-carboxylate.

The described process may be illustrated as follows:

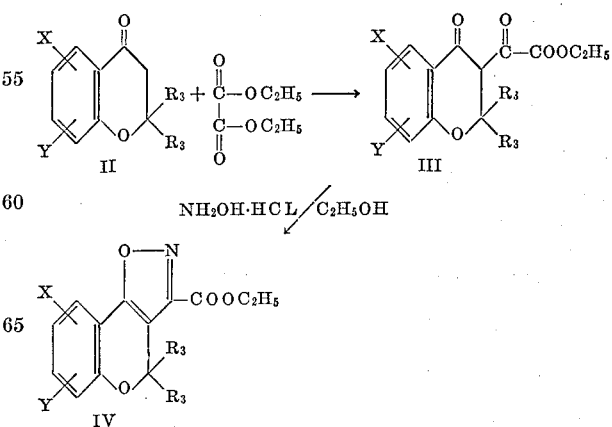

wherein $R_3$, X and Y are as previously defined and do not partake in or interfere with the reaction.

Representative of the compounds which may be prepared by the above processes are:

ethyl 4-oxochroman-3-glyoxylate,
ethyl 4H[1]benzopyrano[3,4-d]isoxazole-3-carboxylate,
ethyl 6-chloro-4-oxochroman-3-glyoxylate,
ethyl 6-methoxy-4-oxochroman-3-glyoxylate,
methyl 7-methyl-4-oxochroman-3-glyoxylate,
methyl 8-methoxy-4H[1]benzopyrano[3,4-d]isoxazole-3-carboxylate, and
ethyl 8-chloro-4H[1]benzopyrano[3,4-d]isoxazole-3-carboxylate The lower alkyl 4H[1]benzopyrano[3,4-d]isoxazole-3-carboxylate (IV) may then be employed to prepare the corresponding amide, carboxhydrazide and carboxylic acid derivatives by application of conventional techniques which may be illustrated as follows:

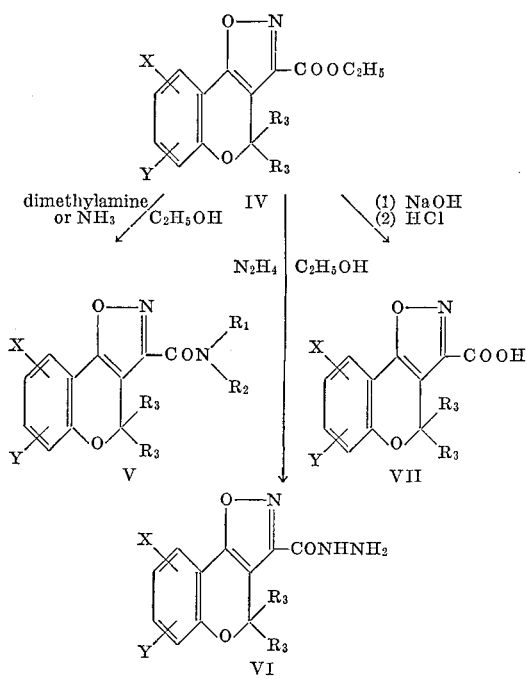

wherein $R_1$ and $R_2$ are both hydrogen or methyl, and $R_3$, X and Y are as previously defined and do not interfere with or partake in the reaction.

Representative of the compounds which may be prepared by the above processes are:

4H[1]benzopyrano[3,4-d]isoxazole-3-carboxamide,
4,4-dimethyl-4H[1]benzopyrano[3,4-d]isoxazole-3-carboxamide,
N-methyl-7-methoxy-4H[1]benzopyrano[3,4-d]isoxazole-3-carboxamide,
N,N-dimethyl-8-trifluoromethyl-4H[1]benzopyrano-[3,4-d]isoxazole-3-carboxamide,
N-benzyl-4H[1]benzopyrano[3,4-d]isoxazole-3-carboxamide,
3-pyrrolidinocarbonyl-8-chloro-4H[1]benzopyrano-[3,4-d]isoxazole-3-carboxamide,
4H[1]benzopyrano[3,4-d]isoxazole-3-carboxhydrazide,
8-chloro-4H[1]benzopyrano[3,4-d]isoxazole-3-carboxhydrazide,
8-methyl-4H[1]benzopyrano[3,4-d]isoxazole-3-carboxhydrazide,
8-trifluoromethyl-4H[1]benzopyrano[3,4-d]isoxazole-3-carboxhydrazide,
7-methoxy-4H[1]benzopyrano[3,4-d]isoxazole-3-carboxhydrazide,
N-methyl-4H[1]benzopyrano[3,4-d]isoxazole-3-carboxhydrazide,
4H[1]benzopyrano[3,4-d]isoxazole-3-carboxylic acid, and
8-chloro-4H[1]benzopyrano[3,4-d]isoxazole-3-carboxylic acid.

The 4H[1]benzopyrano[3,4-d]isoxazole - 3 - carboxamides thus obtained may be converted to the corresponding nitrile by treatment with thionyl chloride in dimethylformamide. The process may be illustrated as follows:

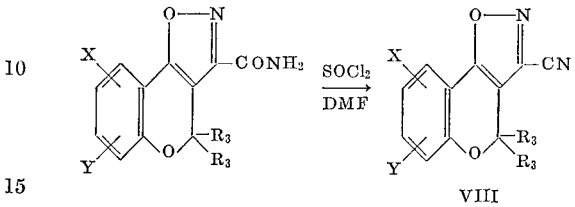

wherein $R_3$, X and Y are as previously defined and do not interfere with or partake in the reaction.

Representative of the compounds which may be prepared by the above process are:

4H[1]benzopyrano[3,4-d]isoxazole-3-carbonitrile,
8-chloro-4H[1]benzopyrano[3,4-d]isoxazole-3-carbonitrile,
6-methoxy-4H[1]benzopyrano[3,4-d]isoxazole-3-carbonitrile, and
7-methyl-4H[1]benzopyrano[3,4-d]isoxazole-3-carbonitrile The nitrile (VIII) serves as a convenient starting material for the preparation of the compounds in which Z is

For example, the nitrile may be treated with hydroxylamine in the presence of sodium methoxide to form the corresponding carboxamidoxime, or the nitrile may be treated with sodium methoxide in anhydrous methanol to form the carboximidate, or with ethanolic methylamine to form the corresponding carboxamidine.

These processes may be illustrated as follows:

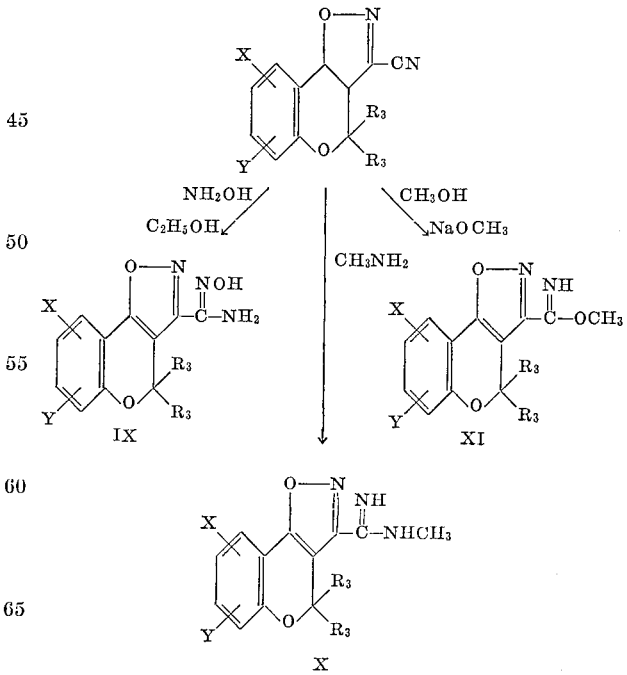

in which $R_3$, X and Y are as previously defined and do not interfere with or partake in the reactions.

Representative of the compounds which can be prepared by the above processes are:

4H[1]benzopyrano[3,4-d]isoxazole-3-carboxamidoxime,
6-chloro-4H[1]benzopyrano[3,4-d]isoxazole-3-carboxamidoxime, 7-methyl-4H[1]benzopyrano[3,4-d]isoxazole-3-
carboxamidoxime,
8-methoxy-N-methyl-4H[1]benzopyrano[3,4-d]-
isoxazole-3-carboxamidine,
N-methyl-6-chloro-4H[1]benzopyrano[3,4-d]isoxazole-
3-carboxamidine,
N-methyl-7-methoxy-4H[1]benzopyrano[3,4-d]-
isoxazole-3-carboxamidine,
methyl 4H[1]benzopyrano[3,4-d]isoxazole-3-
carboximidate,
methyl 6-chloro-4H[1]benzopyrano[3,4-d]isoxazole-3-
carboximidate,
methyl 7-methyl-4H[1]benzopyrano[3,4-d]isoxazole-3-
carboximidate, and
methyl 8-methoxy-4H[1]benzopyrano[3,4-d]isoxazole-
3-carboximidate The corresponding imidazolinyl derivative may be prepared from the carboximidate derivative by treating it with ethylene diamine in methanol under reflux conditions. The process may be illustrated as follows:

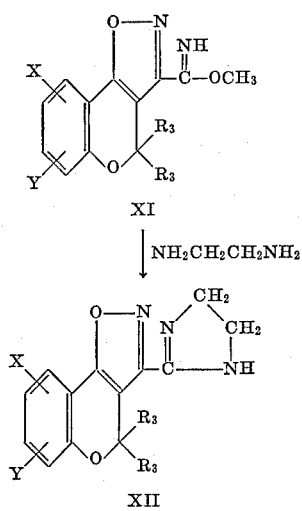

in which $R_3$, X and Y are as previously defined and do not interfere with or partake in the reactions.

Representative of the compounds which can be prepared by the above process are:

3-(2-imidazolinyl)-4H[1]benzopyrano[3,4-d]isoxazole,
3-(2-imidazolinyl)-6-chloro-4H[1]benzopyrano[3,4-d]
isoxazole,
3-(2-imidazolinyl)-7-methyl-4H[1]benzopyrano[3,4-d]
isoxazole, and
3-(2-imidazolinyl)-8-methoxy-4H[1]benzopyrano[3,4-d]
isoxazole The compounds in which $n$ is larger than 1 may be prepared by treating the esters with lithium aluminum hydride to form the corresponding alcohol. The alcohol is then treated with tosyl chloride in a suitable solvent such as pyridine to form the tosylate. The tosylate is then treated with sodium cyanide to form the next higher nitrile which can be used as a starting material in the previously described processes or esterified and employed to prepare the next higher derivatives. If desired, the tosylate may be treated with an amine to form the desired amine derivatives.

The described processes may be illustrated as follows:

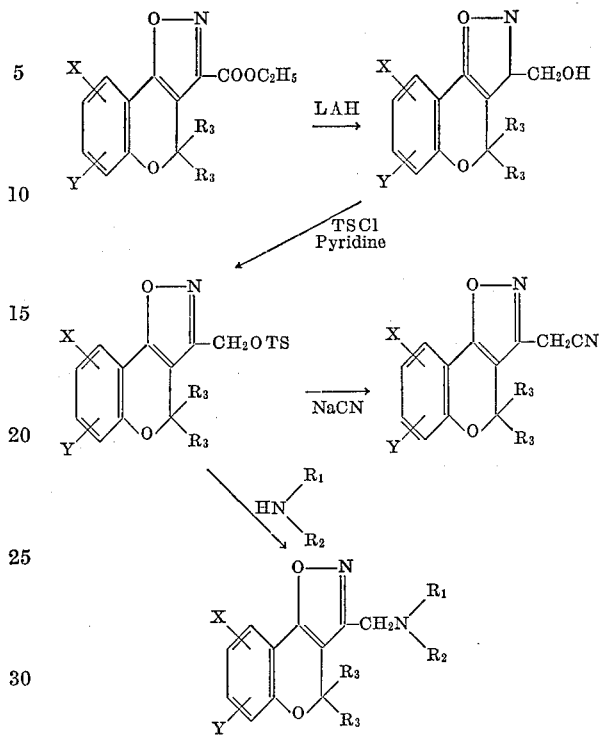

in which all symbols are as previously described and do not partake in or interfere with the reaction.

Acid addition salts of the compounds of the present invention capable of forming such salts may be conveniently produced by contacting the compounds with a suitable acid such as formic acid citric acid, maleic acid, sulfuric acid, hydrochloric acid, succinic acid, tartaric acid, benzoic acid or fumaric acid.

Quaternary ammonium salts may be formed by contacting the compounds capable of forming such salts with a suitable alkylating agent such as dimethyl sulfate, or an alkyl halide such as methyl chloride, methyl iodide or ethyl bromide.

The novel compounds of the present invention, especially the compounds ethyl 4H[1]benzopyrano[3,4-d]isoxazole-3-carboxylate,
4H[1]benzopyrano[3,4-d]isoxazole-3-carboxamidoxime,
methyl 4[1]benzopyrano[3,4-d]isoxazole-3-carboximidate
and
N-methyl 4[1]benzopyrano[3,4-d]isoxazole-3-
carboxamidine have been shown at doses of about 4 to 8 mg./kg. to possess skeletal muscle relaxant activity in the standard test employing the "spinal cat" preparation. The compounds have also produced in animal behavioral studies behavioral profiles similar to those of antihypertensive and diuretic agents. The compounds which form salts may also be used as neutralizing agents and in the purification of and isolation of penicillins, such as benzyl penicillin.

The thiocyanic acid addition salts of the compounds of this invention, when condensed with formaldehyde, form resinous materials useful as pickling agents according to U.S. Pats. 2,425,320 and 2,606,155. The compounds also form fluosilicic acid addition salts which are useful as moth proofing agents according to U.S. Pats. 1,915,334 and 2,075,359.

When intended for pharmaceutical use, the compounds are preferably combined with one or more suitable pharmaceutical diluents and additives and formed into unit dosage forms for oral or parenteral administration such as tablets, capsules and solutions.

The pharmaceutical diluents which may be employed may be either solids such as starch, talc or sugar, or liquids such as water or propylene glycol.

The unit dosage forms may contain a concentration of 0.1% to 10% or more by weight of one or more of the novel compounds. Generally, such dosage forms will contain about 5 to 150 mg. of the active ingredients.

The following examples are presented to illustrate this invention:

EXAMPLE 1

Ethyl 4-oxochroman-3-glyoxylate

A mixture of 74 g. (0.5 mole) of 4-chromanone and 146 g. (1.0 mole) of ethyl oxalate in 375 ml. of anhydrous toluene is added dropwise over 1.25 hours to a suspension of sodium hydride (from 54.4 g. of a 53.3% oil-hydride mixture) in 1 liter of anhydrous toluene under an atmosphere of nitrogen. After stirring at room temperature over night the reaction mixture is added to 1 kg. of ice and stirred 1 hour. The aqueous layer is separated and the organic phase extracted with five 250 ml. portions of $H_2O$. Acidification of the combined extracts with 75 ml. of concentrated hydrochloric acid gives a precipitate of 115.6 g. (94%) of bright yellow solid. Recrystallization from 200 ml. of ethanol gives the ethyl 4-oxochroman-3-glyoxylate, M.P. 72–79° C.

*Analysis.*—Calcd. for $C_{13}H_{12}O_5$ (percent): C, 62.90; H, 4.87. Found (percent): C, 62.68; H, 5.03.

EXAMPLE 2

Ethyl 4H[1]benzopyrano[3,4-d]isoxazole-3-carboxylate

A mixture of 99.2 g. (0.4 mole) of ethyl 4-oxochroman-3-glyoxylate, 29.6 g. (0.425 mole) of hydroxylaminehydrochloride and 800 ml. of ethanol are refluxed for 18 hours, 200 ml. of solvent distilled and the residue cooled to give the isoxazole, M.P. 88–92°. Recrystallization from cyclohexane provides the pure ester, ethyl 4H[1]benzopyrano[3,4-d]disoxazole-3-carboxylate, M.P. 90–92°.

*Analysis.*—Calcd. for $C_{13}H_{11}NO_4$ (percent): C, 63.68; H, 4.53; N, 5.71. Found (percent): C, 63.92; H, 4.67; N, 5.56.

EXAMPLE 3

4H[1]benzopyrano[3,4-d]isoxazole-3-carboxylic acid

A solution of 4.9 g. (0.02 mole) of ethyl 4H[1]benzopyrano[3,4-d]isoxazole-3-carboxylate in 25 ml. of warm ethanol is treated with a solution of 1.5 g. of potassium hydroxide in 25 ml. of ethanol. The precipitate, which forms immediately, is washed with ethanol and dried to give the potassium salt. Treatment of the salt with dilute hydrochloric acid for 5–10 minutes on a steam bath gives the acid, 4H[1]benzopyrano[3,4-d]isoxazole-3-carboxylic acid, M.P. 187.5°, after recrystallization from isopropanol.

*Anaylsis.*—Calcd. for $C_{11}H_7NO_4$ (percent): C, 60.83; H, 3.25; N, 6.45. Found (percent): C, 60.69; H, 3.09; N, 6.64.

EXAMPLE 4

4H[1]benzopyrano[3,4-d]isoazole-3-carboxamide

A solution of 83.9 g. (0.34 mole) of ethyl 4H[1]benzopyrano[3,4-d]isoxazole-3-carboxylate in 850 ml. of warm alcohol is treated with 250 ml. of concentrated aqueous ammonia and the precipitate filtered after 2 hours to give the 4H[1]benzopyrano[3,4 - d]isoxazole-3-carboxamide, M.P. 233–236°.

*Analysis.*—Calcd. for $C_{11}H_8N_2O_3$ (percent): C, 61.11; H, 3.73; N, 12.95. Found (percent): C, 60.93; H, 3.95; N, 12.52.

EXAMPLE 5

4H[1]benzopyrano[3,4-d]isoxazole-3-carbonitrile

A solution of 70.7 g. (0.327 mole) of 4H[1]benzopyrano[3,4-d]isoazole-3-carboxamide in 650 ml. of dimethylformamide at 60° is treated dropwise over 20 minutes with 48.6 g. (0.4 mole) of thionyl chloride. The addition is slightly exothermic and is maintained at 55–63° without external heat. After stirring 5 hours at 60° and at room temperature over night the mixture is poured into several liters of water and the solids filtered and dried. Recrystallization from one liter of cyclohexane gives 4H[1]benzopyrano[3,4-d]isoxazole-3 - carbonitrile, M.P. 127–131°. An analytical sample prepared by recrystillization from methanol melts at 132–134°.

*Analysis.*—Calcd. for $C_{11}H_6N_2O_2$ (percent): C, 66.66; H, 3.05; N, 14.13. Found (percent): C, 66.79; H, 2.96; N, 14.03.

EXAMPLE 6

4H[1]benzopyrano[3,4-d]isoxazole-3-carboxhydrazide

A stirred solution of 16.8 g. (0.069 mole) of ethyl 4H[1]benzopyrano[3,4-d]isoxazole - 3 - carboxylate in 250 ml. of warm ethanol is treated all at once with a solution of 27.6 g. (0.069 mole) of hydrazine hydrate in 100 ml. of ethanol. After heating gently on the steam bath for 30 minutes, the mixture is cooled and the solids filtered to give 4H[1]benzopyrano[3,4-d]isoxazole-3-carboxhydrazide, M.P. 197–199°. A sample recrystallized from isopropanol melts at 195°.

*Analysis.*—Calcd. for $C_{11}H_8N_3O_3$ (percent): C, 57.14; H, 3.93; N, 18.18. Found (percent): C, 56.83; H, 3.71; N, 18.05.

EXAMPLE 7

4H[1]benzopyrano[3,4-d]isoxazole-3-carboxamidoxime

A suspension of 9.9 g. (0.05 mole) of 4H[1]benzopyrano[3,4-d]isoxazole-3- carbonitrile in 125 ml. of methanol is treated with a solution of hydroxyamine obtained from 4.9 g. (0.07 mole) of hydroxylamine hydrochloride, 3.8 g. (0.0704 mole) of sodium methoxide and 75 ml. of methanol. After 16 hours at room temperature the solids (10.7 g., M.P. 234–237°) are filtered and recrystallized twice from 500 ml. of n-butanol to give 4H[1]benzopyrano[3,4-d]isoxazole - 3 - carboxamidoxime, M.P. 236–237°.

*Anaylsis.*—Calcd. for $C_{11}H_9N_3O_3$ (percent): C, 57.14; H, 3.93; N, 18.18. Found (percent): C, 57.41; H, 3.91; N, 18.26.

EXAMPLE 8

Methyl 4H[1]benzopyrano[3,4-d]isoxazole-3-carboximidate

A mixture of 10.0 g. (0.055 mole) of 4H[1]benzopyrano[3,4-d]isoxazole-3-carbonitrile, 0.5 g. of sodium methoxide and 150 ml. of anhydrous methanol is stirred at room temperature for 1.5 hours. A solution first forms followed by subsequent precipitation. Filtration of the precipitate and recrystallization from cyclohexane gives methyl 4H[1]benzopyrano[3,4 - d]isoxazole-3-carboximidate, M.P. 124–126°.

*Analysis.*—Calcd. for $C_{12}H_{10}N_2O_3$ (percent): C, 62.61; H, 4.38; N, 12.17. Found (percent): C, 62.52; H, 4.30; N, 12.20.

EXAMPLE 9

3-(2-imidazolinyl)-4H[1]benzopyrano[3,4-d]isoxazole

A mixture of 4.6 g. (0.022 mole) of methyl 4H[1]benzopyrano[3,4-d]isoxabole - 3 - carboximidate, 4.8 g. (0.08 mole) of ethylenediamine and 50 ml. of methanol is heated to reflux. A solution forms after 15 minutes and subsequent precipitation occurs in 1.5 hours. After 3.5 hours, the hot mixture is filtered to give 2.8 g. of the product, M.P. 209–211°. Recrystallization from benzene and then from carbon tetrachloride gives 3-(2-imidazolinyl)-4H[1]benzopyrano[3,4-d]isoxazole, M.P. 216–217°. and a second crop, M.P. 213–215°.

*Analysis.*—Calcd. for $C_{13}H_{11}N_3O_2$ (percent): C, 64.72; H, 4.60; N, 17.42. Found (percent): C, 65.18; H, 4.72; N, 17.45.

EXAMPLE 10

N-methyl 4H[1]benzopyrano[3,4-d]isoxazole-3-carboxamidine

A mixture of 3.9 g. (0.0197 mole) of 4H[1]benzopyrano[3,4-d]isoxazole-3-carbonitrile and 25 ml. of 5 N ethanolic methylamine is stirred magnetically in a stoppered flask. After 15 minutes 25 ml. of ethanol is added and after an additional 15 minutes the solids are filtered, washed with water and recrystallized from isopropanol to give 2.7 g. (60%) of the product, M.P. 160–161°. Recrystallization from isopropanol, benzene and finally carbon tetrachloride gives N-methyl 4H[1]benzopyrano[3,4-d]isoxazole-3-carboxamidine, M.P. 160.5–161°.

*Analysis.*—Calcd. for $C_{12}H_{11}N_3O_2$ (percent): C, 62.88; H, 4.84; N, 18.33. Found (percent): C, 63.06; H, 4.81; N, 18.80.

We claim:

1. A compound of the formula

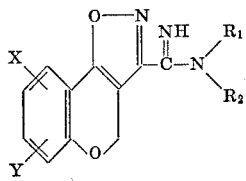

in which X and Y are hydrogen, halo, alkyl of 1 to 4 carbons, alkoxy of 1 to 3 carbon atoms and trifluoromethyl and $R_1$ and $R_2$ are selected from hydrogen, alkyl of 1 to 4 carbon atoms or phenyl-lower alkyl of 7 to 11 carbon atoms or pharmaceutically acceptable acid addition salts thereof.

2. A compound of claim 1 in which $R_1$ is hydrogen.

3. A compound of claim 1 in which $R_1$ is hydrogen and $R_2$ is an alkyl of 1 to 4 carbon atoms.

4. A compound of claim 1 in which X and Y are hydrogen, $R_1$ is hydrogen and $R_2$ is an alkyl of 1 to 4 carbon atoms.

5. A compound of claim 1 in which X and Y are hydrogen, $R_1$ is hydrogen and $R_2$ is methyl.

No references cited.

ALEX MAZEL, Primary Examiner

J. TOVAR, Assistant Examiner

U.S. Cl. X.R.

260—247.5, 268, 294.7; 424—272